United States Patent [19]
Radow

[11] Patent Number: 5,893,719
[45] Date of Patent: Apr. 13, 1999

[54] VARIABLE PATHOLOGICAL AND SURGICAL EYE MODEL AND METHOD RELATED THERETO

[76] Inventor: Brett K. Radow, 6621 Kanawha Ave., Charleston, W. Va. 25304

[21] Appl. No.: 08/959,592

[22] Filed: Oct. 29, 1997

[51] Int. Cl.⁶ .................................................. G09B 23/28
[52] U.S. Cl. .................................................. 434/271
[58] Field of Search .................................... 434/271

[56] References Cited

U.S. PATENT DOCUMENTS

| | | | |
|---|---|---|---|
| 1,042,815 | 10/1912 | Myers | 434/271 |
| 1,582,199 | 4/1926 | Walters | 434/271 |
| 1,630,944 | 5/1927 | Ingersoll | 434/271 |
| 3,177,593 | 4/1965 | Loeb | 434/271 |

FOREIGN PATENT DOCUMENTS

| | | | |
|---|---|---|---|
| 1082424 | 3/1984 | U.S.S.R. | 434/271 |
| 1401508 | 6/1988 | U.S.S.R. | 434/271 |
| 1552222 | 3/1990 | U.S.S.R. | 434/271 |

*Primary Examiner*—John A. Ricci
*Attorney, Agent, or Firm*—Robert N. Blackmon

[57] ABSTRACT

A structural eye assembly is provided comprising replaceable components exhibiting healthy conditions, pathological states and post-surgical conditions, and a related method thereto. The assembly preferably comprises a spherical eye body of structural (sturdy) soft and somewhat pliable material in the shape of human eye, preferably in an enlarged scale relative to the human eye for the ease of observation of the various structural components. The assembly includes a cornea which is replaceable with a plurality of corneas exhibiting various pathological structures and structural damages. The removable cornea is made of a clear, soft and pliable material to simulate a human cornea. Corneal pathological states are exhibited on various replaceable corneas to allow the educator or physician to selectively demonstrate the pathological state to the student or patient. The crystalline lens also is removable and the assembly includes replaceable lenses which exhibit various pathological structures, such as cataracts, as well as a intraocular lens implant rendition. The eye assembly also contains a liquid filled central cavity to simulate the vitreous humor, and within it vitreous floaters. Also demonstrated by this model are normal and abnormal retinal conditions. Optionally, also shown by this model is a fine layer surrounding the assembly to represent human conjunctiva.

16 Claims, 8 Drawing Sheets

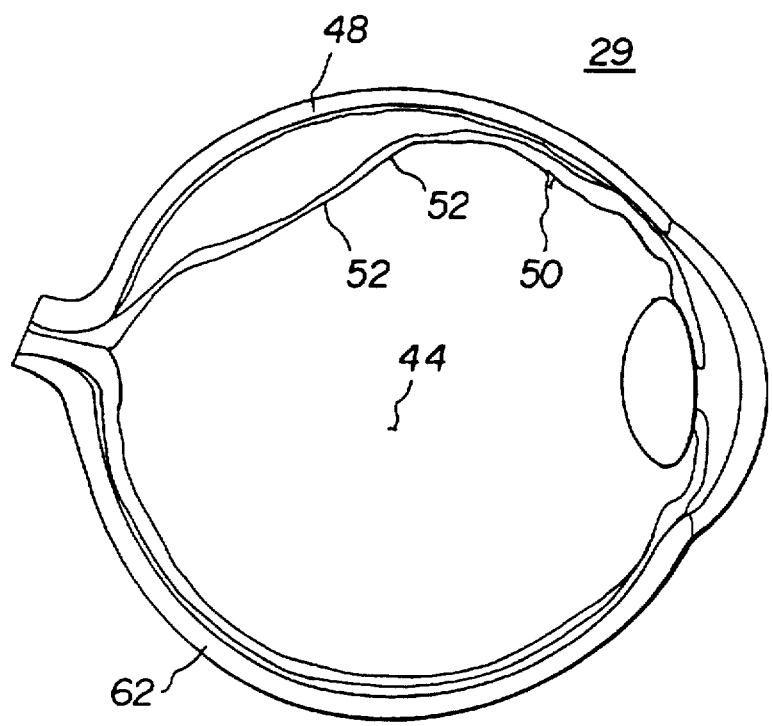
FIG. 3
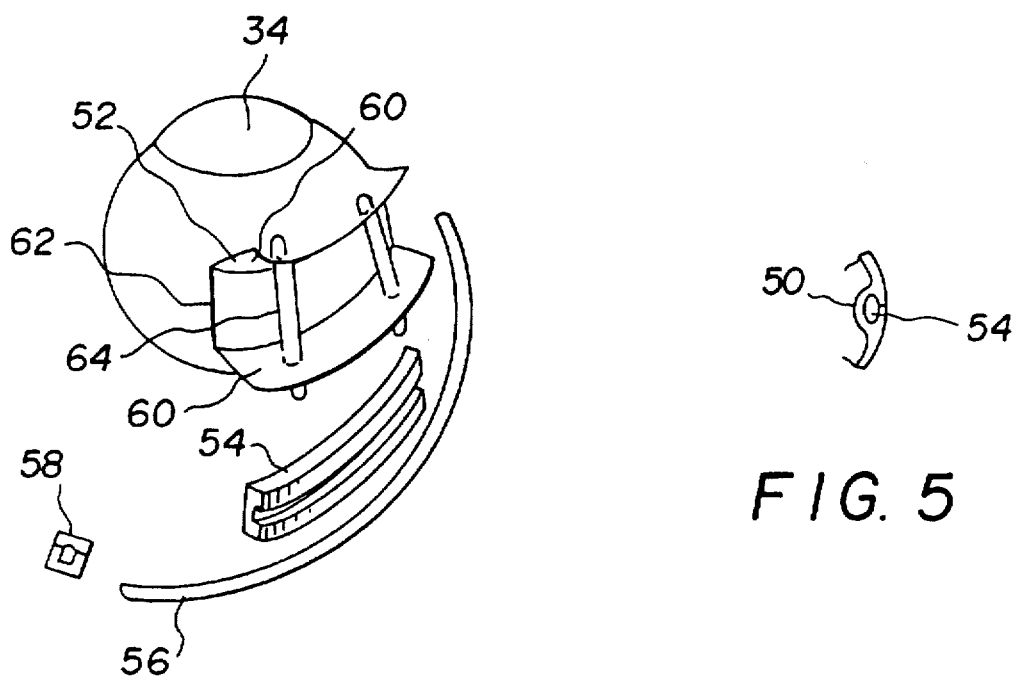
FIG. 4
FIG. 5

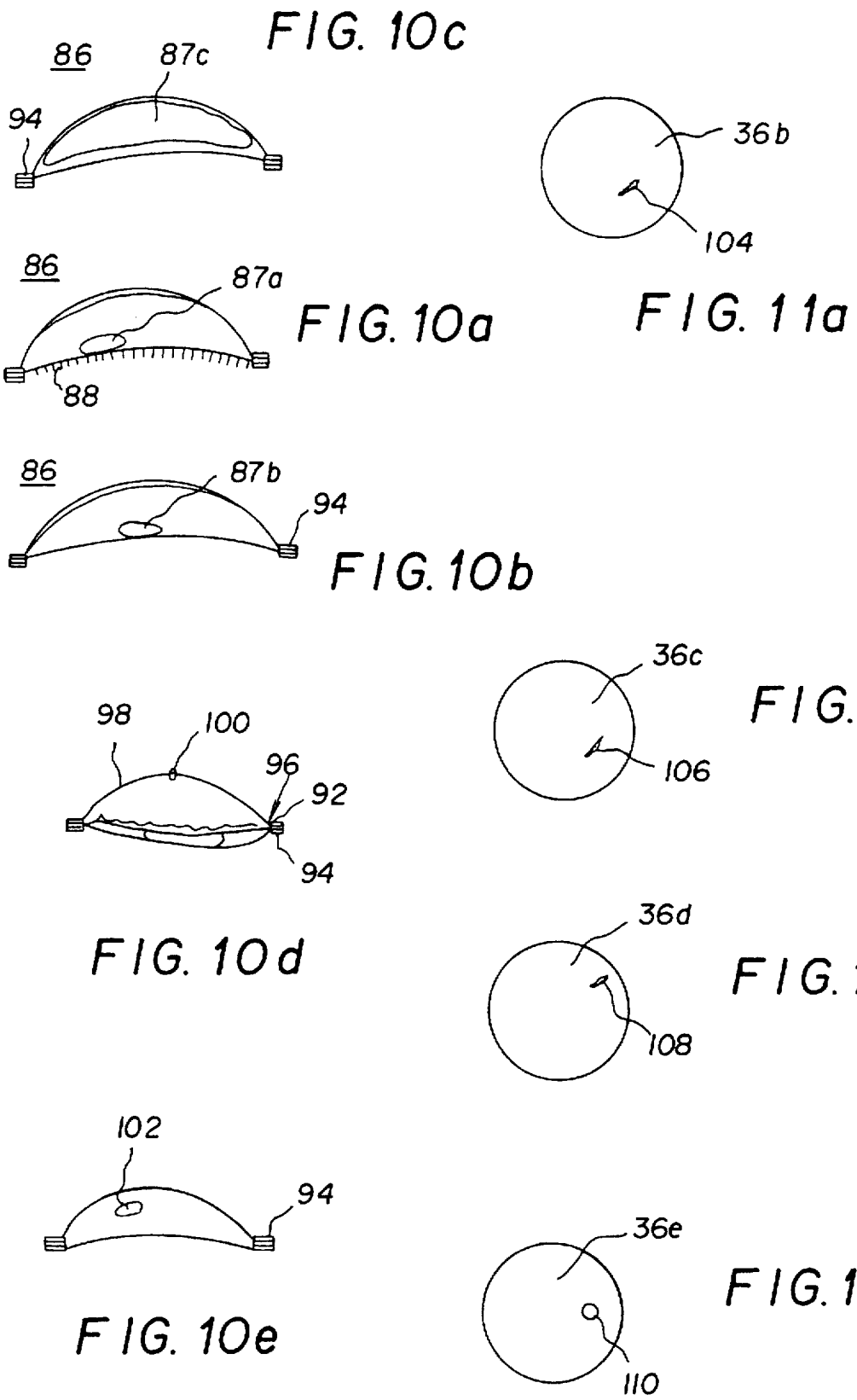

VARIABLE PATHOLOGICAL AND SURGICAL EYE MODEL AND METHOD RELATED THERETO

BACKGROUND OF THE INVENTION

1. Field of the Invention

The present invention relates to three dimensional medical models and methods related thereto, and more particularly relates to three dimensional eye models and methods related thereto.

2. Description of the Related Art

Prior three dimensional eye models have existed, and have generally modeled a healthy eye. The use of such models of healthy eyes have been useful as teaching aids and in demonstrating normal anatomy and physiology. Such models however have led to confusion and difficulty in permitting physicians and more specifically eye doctors and eye surgeons to explain various pathological states and surgical procedures for patients, patients' families and medical students. For example, prior eye models have not been useful in selectively showing some specific tissue of the eye which is commonly afflicted by infections, irritations and other pathology or disease process. Prior eye models have failed to show common conjunctival afflictions such as conjunctival hemorrhage, abrasion, laceration, pinguecula and allergic, mechanical or infectious conjunctivitis. Also prior models have not shown a distinct and realistic vitreous fluid, representing the vitreous humor of the human eye, and therefore not representing cellular debris in the vitreous, "vitreous floaters." Prior models have not been useful in showing corneal pathology, such as corneal abrasions, corneal ulcers, corneal lacerations, and pterygium. Other anomalies of the cornea such as neovascularization, hemorrhages and clear corneal incision for cataract/lens implant surgery have not been demonstrated before. Specific and detailed retinal conditions, and retinal disease will be displayed in this improved model, whereas prior models have failed to detail such important situations such as retinal detachments and retinal breaks, like retinal tears and retinal holes. Also, no prior art exists on eye models detailing the retinal conditions and diseases such as, choroidal nevi, lattice degeneration, choroidal melanoma, macular degeneration, and diabetic retinopathy. Prior models have never demonstrated the human eyelid in normal anatomical conditions or in pathologic states as well. Therefore, prior models have not been useful for exhibiting human eyelid anatomy or related eyelid disease states, for example eyelid disorders such as chalazion, dermatochalasis, hordeolum, ptosis and other eyelid abnormalities.

Consequently, there is a need and a desire to provide an eye model and related method for selectively modeling specific (realistic, distinct) anatomical features of the human eye as well as selectively demonstrating and illustrating various disease states. There is also a need to provide such selective and realistic models to enable health care providers and educators a means for teaching, demonstrating and otherwise communicating in a precise informative manner the conditions (disease states) to students, patients, family members of afflicted patients and health care providers.

SUMMARY OF THE INVENTION

The present invention involves a structural eye assembly comprising replaceable components exhibiting healthy conditions, pathological states and post-surgical conditions. The assembly comprises a spherical eye body of structural (sturdy) soft and somewhat pliable material in the shape of the human eye, preferably in an enlarged scale relative to the human eye for the ease of observation of the various structural components. The assembly includes a cornea which is replaceable with a plurality of corneas exhibiting various pathological structures and structural damages. The removable cornea is made of a clear, soft and pliable material to simulate a human cornea. Corneal pathological states is exhibited on various replaceable corneas to allow the educator or physician to selectively demonstrate the pathological state to the student or patient. The crystalline lens is also removable and the assembly includes replaceable lenses which exhibit various types and stages of cataract development and pathological structures. Also contained within this eye model assembly will be a liquid vitreous body, to demonstrate the vitreous humor in a more realistic nature than previous models and contained within the liquid vitreous are "floaters" to simulate the human affliction of vitreous floaters.

BRIEF DESCRIPTION OF THE DRAWINGS

FIG. 3 is a vertical cross sectional view of a structural eye sub assembly;

FIG. 4 is a prospective view of an eye subassembly exhibiting a scleral buckling procedure;

FIG. 5 is a cut away view of a silicon pad in an eye body sub assembly illustrating the results of a scleral buckling procedure;

FIG. 10a is a front elevational view of an eyelid having a chalazion;

FIG. 10b is a front elevational view of an eyelid having a stye;

FIG. 10c is a front elevational view of an eyelid having a dermatochalasis;

FIG. 10d is a cut away vie of an eyelid having ptosis;

FIG. 10e is a front elevational view of an eyelid having a subconjunctival hemorrhage;

FIG. 11a is a front elevational view of a cornea having an abrasion;

FIG. 11b is a front elevational view of a cornea having a laceration;

FIG. 11c is a front elevational view of a cornea having a foreign body imbedded therein;

FIG. 11d is a front elevational view of a cornea having a corneal ulcer;

DETAILED DESCRIPTION OF THE INVENTION

Figure 1:
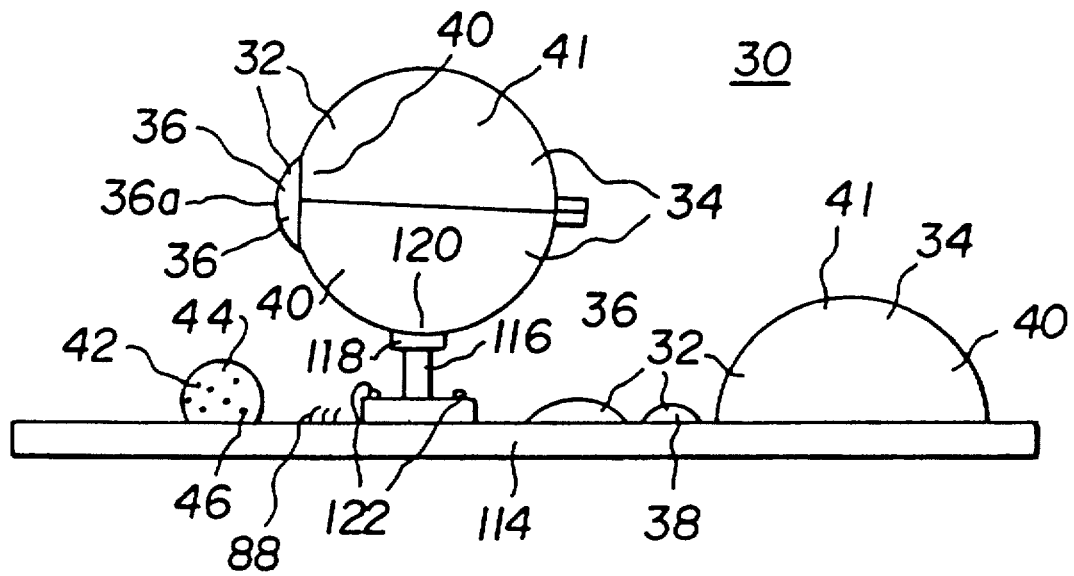
FIG. 1 is a side elevational view of the structural eye assembly according to the present invention.

As shown in FIG. 1, the present invention involves a structural eye assembly (30) comprising replaceable components (32) exhibiting healthy conditions and pathological states and post-surgical conditions. The assembly (30) comprises a spherical eye body (34) of structural (sturdy) soft and somewhat pliable (plastic/rubber) material in the shape of human eye, preferably in an enlarged scale relative to the human eye for the ease of observation of the various structural components (32). The assembly includes at least one cornea (36) wherein a first cornea exhibiting healthy characteristics is replaceable with a plurality of corneas (36) exhibiting various pathological structures and structural damages. The removable cornea (36) is made of a clear, soft and pliable material to simulate a human cornea. Corneal pathological states is exhibited on various replaceable corneas (36) to allow the educator or physician to selectively demonstrate the pathological state to the student or patient.

Various corneal pathological states include corneal abrasion, corneal ulcer, corneal neovascularization, pterygium corneal dystrophy, and clear corneal incision for cataract extraction. The replaceable corneas also include corneas exhibiting the after-effect of procedures of radial keratonomy, photo refractive keratectomy, automated lamellar keratoplasty (ALK) and laser assisted keratoplasty.

The corneas (36) of the present assembly (30) are removable and replaceable in order to demonstrate various corneal conditions.

The assembly (30) further comprises a crystalline lens (38) depicting healthy characteristics which is removable and the assembly (30) includes replaceable lenses (38) which exhibit various pathological structures and structural damage.

The assembly (30) also includes a fine, clear layer of material (40) over the spherical body to simulate a human conjunctiva (40), and illustrates the small vessels within the conjunctiva (40). The clear layer of material (40) also contains within it, materials exhibiting pathological changes, for example, subconjuctival hemorrhage and pinguecula.

Figure 2:
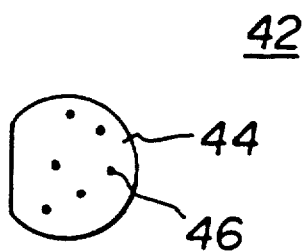
FIG. 2 is a clear vitreous chamber having vitreous floaters.

As shown in FIG. 2, the assembly (30) also includes a clear vitreous chamber (42) which contains a clear liquid (44) (a clear, jellylike fluid known as the vitreous humor) having therein vitreous floaters (46).

As shown in FIGS. 1 and 3, the assembly (30) also includes a plurality of retinas (48) (each associated with a respective body (34) (body half (41)), at least one of which exhibits retinal tear (50), at least one of which exhibits retinal detachment (52) wherein part of the retina actually drapes from the choroid and into the vitreal cavity. As shown in FIG. 16, preferably at least one retina will also show the pathological appearance of macular degeneration (200), retinal drusen (201), choroidal nevi (204) and choroidal melanoma (202), as also shown in FIG. 15.

As set forth above, the assembly (30) includes a plurality of outer bodies (34) (or body portions or body halves (41)), at least one of which as shown in FIG. 4 includes structural elements associated with a scleral buckling procedure exhibiting surgical repair for retinal detachment (and/or retinal tear), and including silicon pad (or pads) (54) and sclera buckling material (band (56) and clip (58)), wherein the band encircles the eye body (34). The body exhibiting the elements of the scleral buckling procedure, preferably has flaps (60) of sclera (62) cut for insertion (positioning) of the pads (54) between the sclera and the retina (48) adjacent the detachment (52) or the tear (50), as also shown in FIG. 5. The flaps (60) are pulled together to abut each other by use of sutures (64).

Figure 15:
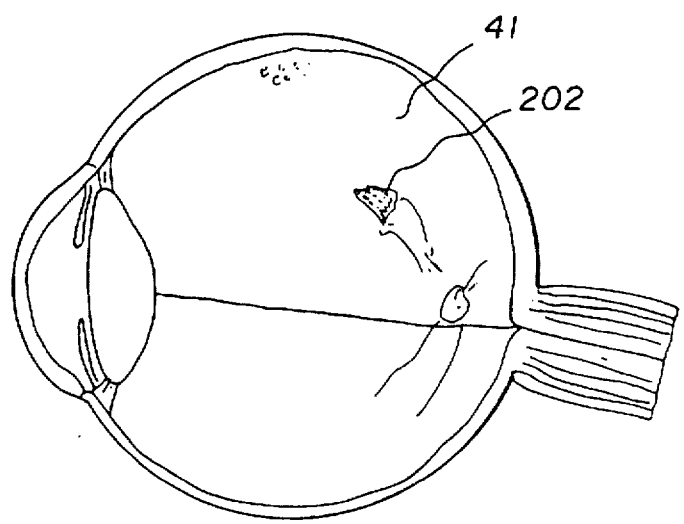
FIG. 15 is a vertical cross sectional view of an eye body having lattice degeneration and choroidal melanoma.
Figure 16:
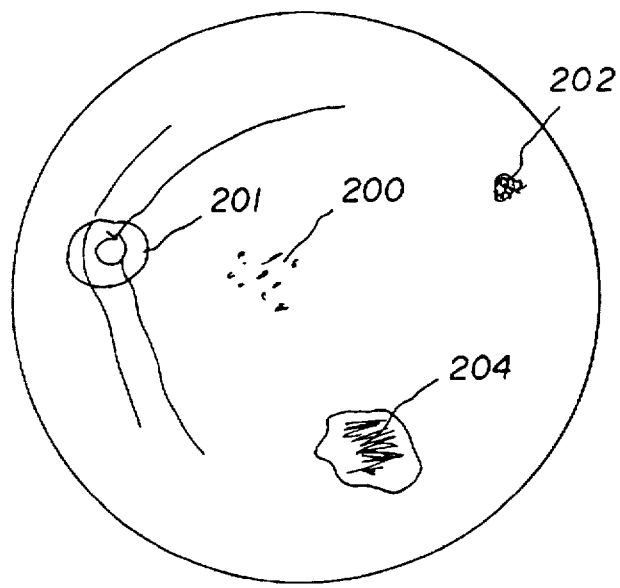
FIG. 16 is a cutaway view of an eye body having having a retina having macular scarring, macular degeneration and choroidal nevi.

As shown in FIG. 15, at least one of the bodies (34) (body halves (41)) preferably has a retina which exhibits a choroidal melanoma (202) and as shown in FIG. 16, preferably at least one of the bodies (34) (halves (41)) has a retina which exhibits a choroidal nevi (204).

Figure 6:
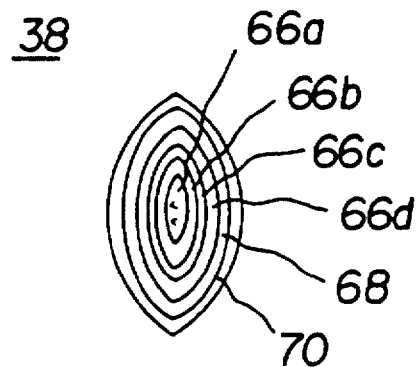
FIG. 6 is a vertical cross sectional view of a lens of the sub assembly.
Figure 7:
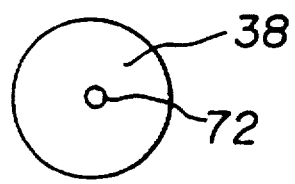
FIG. 7 is a front elevational view of a lens exhibiting a pathological structure.
Figure 12A:
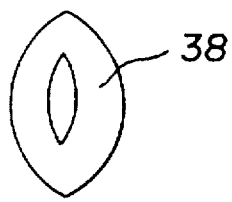
FIG. 12a is a vertical cross sectional view of a normal lens with a normal nucleus.
Figure 12B:
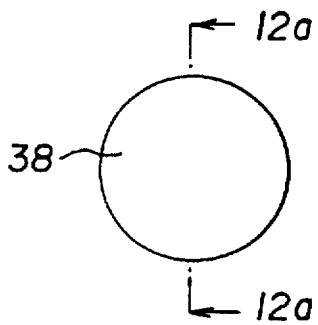
FIG. 12b is a front elevational view of a normal lens with a normal nucleus.
Figure 12C:
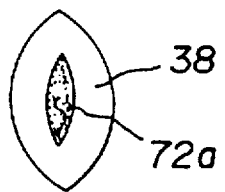
FIG. 12c is a vertical cross sectional view of a lens having a nuclear cataract.
Figure 12D:
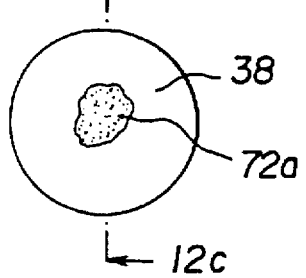
FIG. 12d is a front elevational view of a lens having a nuclear cataract.
Figure 12E:
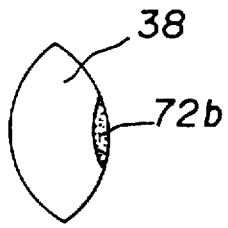
FIG. 12e is a vertical cross sectional view of a lens having a posterior sub capsular cataract.
Figure 12F:
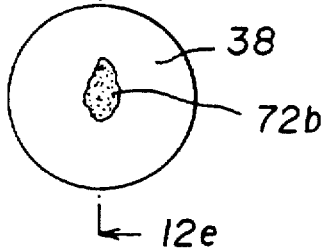
FIG. 12f is a front elevational view of a lens having a posterior sub capsular cataract.
Figure 12G:
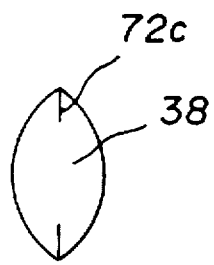
FIG. 12g is a vertical cross sectional view of a lens having a cortical cataract.
Figure 12H:
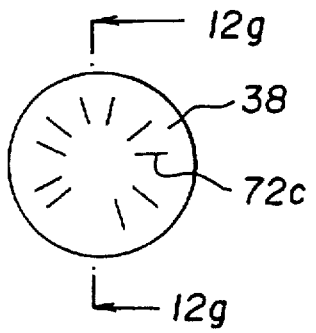
FIG. 12h is a front elevational view of a lens having a cortical cataract.

As shown in FIG. 6, at least one of the replaceable lenses (38) preferably exhibits three distinct layers, specifically the nucleus (66) (the nucleus layer may have an embryonic nucleus layer (66a), a fetal nucleus layer (66b), an infantile nucleus layer (66c) and an adult nucleus layer (66d)), a cortex layer (68) and a capsule (anterior and posterior capsule) (70). A clear lens is shown in FIGS. 12a and 12b. As shown in FIGS. 7, 12b, 12c, 12d, 12e, 12f, 12g and 12h, preferably, more than one of the lenses (38) exhibits cataract formation, and exhibits cataract structures (72) such as nuclear cataracts (72a), cortical cataracts (72c) and posterior sub-capsular cataracts (72b).

Optionally, the assembly (30) also includes a lens implant rendition to show how the implant is implanted into the eye. Optionally, the superior sclera also shows the surgical tunnel which is used for the phacoemulsification-type of cataract surgery with lens implantation.

Figure 8:
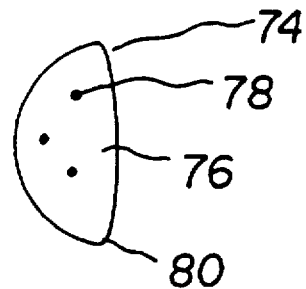
FIG. 8 is a side elevational view of an anterior chamber insert having floaters.
Figure 9:
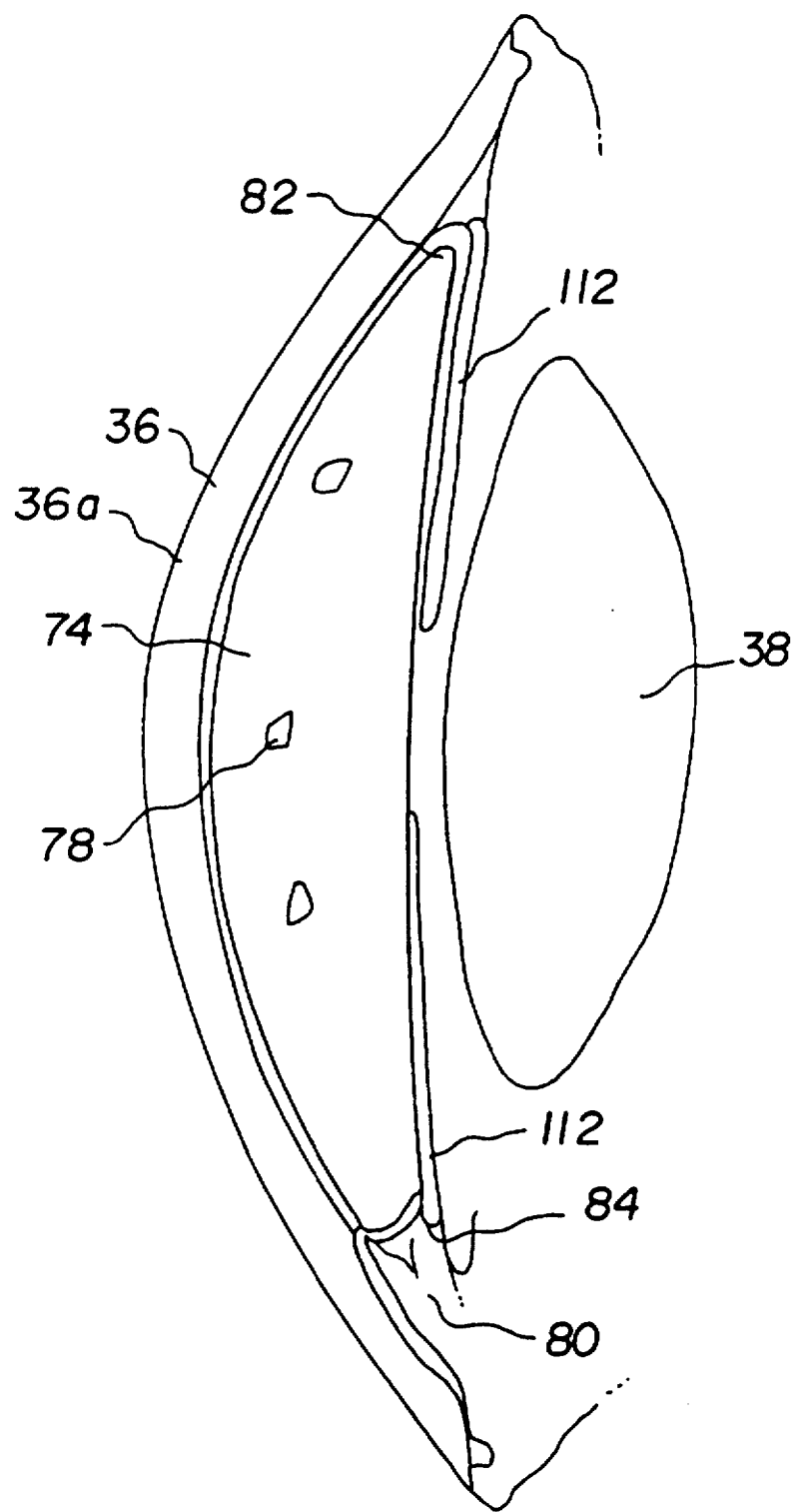
FIG. 9 is a cut away view of an eye sub assembly having an interior insert having floaters.

The assembly (30) also includes, as shown in FIG. 8, an anterior chamber insert (74) which includes anterior chamber fluid (76) and includes at least one anterior chamber insert having floaters (78) therein and having trabecular meshwork blockage (80) to demonstrate the effect of the materials impeding drainage of the anterior chamber. The replaceable anterior chambers may also demonstrate various anterior chamber widths to demonstrate the angle effect of the anterior chamber (74) that includes, as shown in FIG. 9, anatomical features associated with the angle (82), and optionally including scleral spur, the trabecular meshwork (84) and the iris root.

Figure 20:
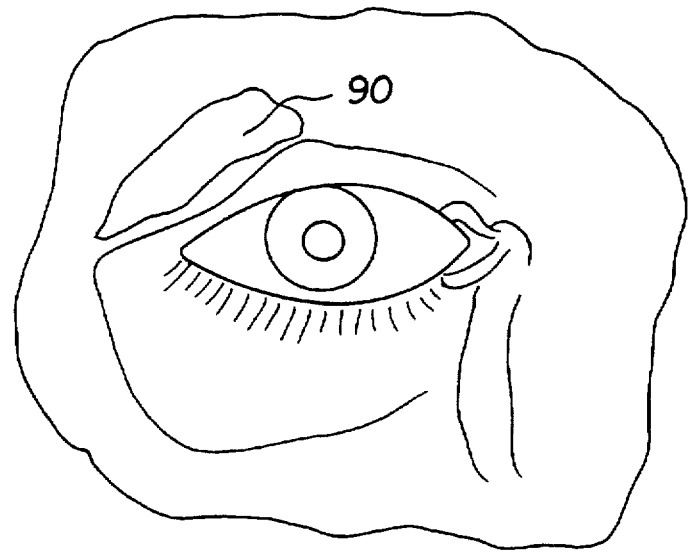
FIG. 20 is a front elevational cutaway view of an eye body showing a lacrimal gland.

The assembly (30) also includes replaceable eyelids (86), best shown in FIGS. 10a, 10b, 10c, 10d and 10e, which are placeable on the anterior segment of the eye and are made of a soft pliable material which simulates the appearance and function of the human eyelid. The eyelid also includes eyelashes (88). The assembly (30) also includes, as best shown in FIG. 20, the lacrimal gland (90) positioned underneath the temporal aspect of the eyelid (86). As shown in FIGS. 10a–10c, various replaceable eyelids demonstrate different pathological conditions (87), such as chalazion (87a), stye (87b) and dermatochalasis (87c).

As shown in FIG. 10d, the eyelid (86) may be partially closed to illustrate the condition of ptosis. Ptosis is a condition involving drooping of the eyelid. The present assembly (30) permits demonstration of the condition by permitting selective positioning of the eyelid (86) part way over the cornea (36) of the eye by a pivot means (92) comprising a gear pin (94) on each side of the eyelid for insertion into the body (34) and into a biasing spring (96) (bent metal strip, or spring biased retainer ball) for permitting and for maintaining the position of the eyelid relative to the eyeball (relative to the cornea), and the top of the eyelid preferably has a curved retainer wire (98) which is snap fitted into a retainer clip (snap) (100) affixed to the body (34) above the cornea (36) for maintaining the top of the eyelid in the desired position. Various types of ptosis exist including congenital and acquired.

The moveability of the eyelid and the realistic nature of this model allows for exhibiting entropion, which refers to the eyelid turning inwards and causing the eyelashes to engage the eye and thereby irritate the eye. Also demonstrable is ectropion, which involves the lower lid sagging and turning outward. This condition is shown by the lower lid of the eyelid being made of a flexible material. The condition of lagophthalmus, which involves the upper lid and the lower lid not coming together to form a complete closure, thereby causing undesired drying of the eye and potential eye infection is also shown. Trichiasis, which involves the growth of the eye lashes in an inward direction resulting in irritation of the cornea, and may optionally be illustrated by the model having removable individual eye lashes which may be inserted into receiving holes either in the front side of the eyelid or the backside of the eyelid to illustrate either normal directional growth of the lashes or undesired inward growth of the eye lashes is therefore possible. Dermatochalasis, which involves the skin losing its normal healthy elasticity typically due to aging and results in a fold of skin hanging over the lower portion (margin) of the upper eyelid, and as illustrated by a replacement eyelid of the present model which has an excess fold of skin over the lower part (margin) of the upper eyelid; chalazion which involves blockage of a duct and inflammation of a Meibomian gland resulting in accumulation of fat like lipids and a swelling of the respective lid, and is illustrated by a replacement eyelid (or the normal anatomical eyelid with an inflammed gland inserted into it) in the present model having a hard sty like inflammation in the lid; hordeolum also referred to as a sty which is typically due to infection of a lash follicle resulting in a swelling that produces puss, and also may be caused by infection of related glands, as illustrated by a replacement eye lid having a swelling and soft top layer to illustrate puss formation.

Figure 13:
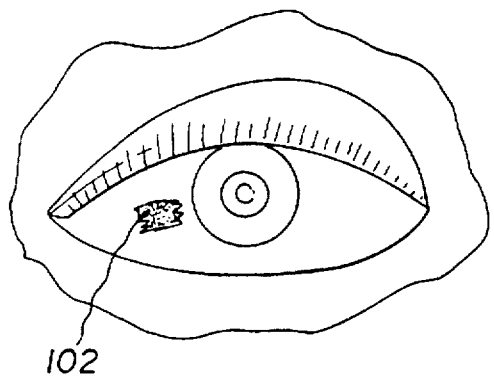
FIG. 13 is a cut away front elevational view of an eye assembly having a subconjunctival hemorrhage.

Shown in FIG. 13, the assembly demonstrates a subconjunctival hemorrhage (102) as illustrated by a bright red spot on the conjunctival.

Figure 18:
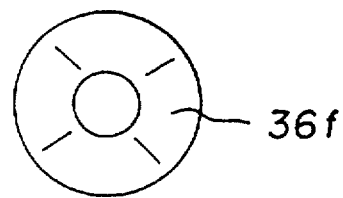
FIG. 18 is a front elevational view of an radial keretomy incision.
Figure 19:
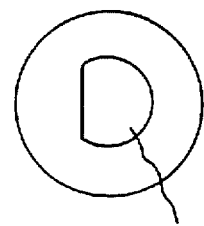
FIG. 19 is a front elevational view of a flap healing in lasik.

The cornea (36) of the present invention is actually a set of replaceable corneas which preferably securely snap fit (as shown in FIG. 9) into the body (34) and are removable and replaceable in order to selectively demonstrate the condition of the cornea either in a healthy state or selectively one of numerous damaged or unhealthy states. As shown in FIGS. 11a, 11b, 11c and 11d, the set of corneas (36) involving the unhealthy states include corneal abrasion (36b) (abrasion (104)) which is typically caused by contact of an undamaged cornea (36a) with a foreign object such as a stick and may be typically treated with an antibiotic and optionally a pain treating agent, and/or eye patch. A cornea (36c) having corneal lacerations (106) which typically involve perforation of the cornea. A cornea (36d) having foreign bodies (body) (splinters) (108) lodged on the surface of the cornea which may typically be removed, and a cornea (36e) having corneal ulcers (ulcer) (110). As shown in FIGS. 18–19, the present assembly also provides interchangeable corneas (36) which exhibit the results of various corneal surgical procedures including radial keratonomy (cornea (36f)); photo refractive keratectomy; automated lamellar keratoplasty (cornea (36g)); laser assisted keratoplasty; and lasik. Keratoplasty involves corneal transplantation wherein the diseased portion of the cornea is removed and a donor material is grafted as a replacement and is sutured into place. Lamellar keratoplasty involves removing and replacing an outer layer of the cornea, as in contrast to penetrating keratoplasty which involves replacing the entire depth of the cornea. Photo refractive keratectomy involves changing the refraction of the cornea by changing the curvature thereof. Retinal detachment is illustrated in a replacement portion of the model as well as the scleral buckling procedure which involves utilization of silicone pads placed around the eyeball and held into position with a scleral buckle to functionally indent the sclera and choroid to keep the retina and choroid in contact thereby facilitating reattachment of the retina to the choroid.

Figure 17:
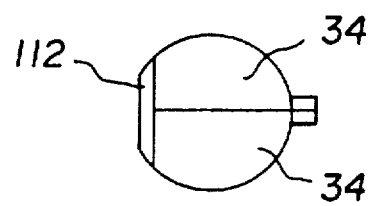
FIG. 17 is a side elevational view of an eye body.

The iris (112), as shown in FIG. 17, is also replaceable (or changeable) in order to show the differences between healthy iris and an iris which has defects, such as an iris exhibiting iris atrophy. Also, the condition of surgical iridectomy is easily demonstrated with this model.

Figure 14:
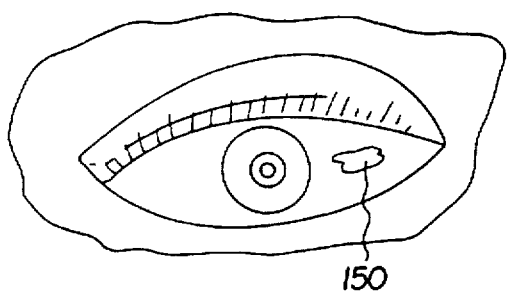
FIG. 14 is a cutaway front elevational view of an eye assembly having a yellowish nodule.

The assembly also includes a storage base (114) for retaining all of the assembly components in a neatly stored arrangement for quick and easy selection of the appropriate combination of components for use in combination. The assembly also includes a releasable attached stand (116) (magnetic coupling—magnetic elements in the head (118) of the stand and in the bottom region (120) of the eye body). The base (118) preferably has retention grooves for receiving the respective components of the assembly. The base may also have upright retention pegs (122) which extend into holes in the bottom of the stand for releasable securing the stand to the base. The preferred structural eye assembly comprises: (a) a vitreous fluid chamber comprising (i) particles having a density of between 0.5 and 1.5 grams per centimeter cubed, and (ii) a fluid having a density of between 0.5 and 1.5 grams per centimeter cubed. The particles preferably freely float within the fluid to resemble vitreous floater in a human eye. As shown in FIG. 14, an eye having a yellowish nodule (150) may be used to demonstrate the condition of pinquecula.

What is claimed is:

1. A structural eye assembly comprising:
   (a) a vitreous fluid chamber, said chamber comprising (i) particles having a density of between 0.5 and 1.5 grams per centimeter cubed, and (ii) a fluid having a density of between 0.5 and 1.5 grams per centimeter cubed.

2. The assembly of claim 1 wherein said liquid is water.

3. The assembly of claim 1 wherein said particles are flakes.

4. The assembly of claim 1 wherein said vitreous chamber is removable from said eye assembly.

5. The assembly of claim 1 wherein said assembly further comprises a plurality of replaceable crystalline lenses, at least one of said lenses being smooth and transparent, at least one of said lenses having an opacity (cataract) thereof.

6. The assembly of claim 1 wherein said assembly further comprises a plurality of replaceable crystalline lenses, at least one of said lenses comprising a intraocular lens implant.

7. The assembly of claim 1 wherein said assembly comprises interchangeable corneas, at least one cornea exhibiting healthy characteristics, and at least one cornea exhibiting pathological structures.

8. The assembly of claim 1 wherein said assembly comprises a retina having a retinal tear.

9. The assembly of claim 1 wherein said assembly includes a retina and exhibits a retinal detachment.

10. The assembly of claim 1 wherein said assembly comprises silicone pads secured to the eye with a band to exhibit repair of retinal detachment.

11. The assembly of claim 1 wherein said assembly comprises replaceable eye lids.

12. The assembly of claim 1 wherein said assembly comprises replaceable eye lids exhibiting pathological structures.

13. The assembly of claim 1 wherein said liquid is a clear gel.

14. The assembly of claim 1 wherein said assembly further comprises layer of conjunctiva.

15. A method for providing medical instruction to a person, said method comprising:

(a) providing a three-dimensional model of a healthy eye including a layer of conjunctiva, said model comprising removable normal healthy components, (b) replacing one of said removable components with an instructional component having a pathological structure.

16. A method of instructing eye patients about an eye abnormality, said method comprising:

(a) providing an eye model assembly including a vitreous fluid chamber having fluid therein; said eye model assembly further comprising (I) an eye body subassembly having components exhibiting health conditions and (ii) components exhibiting pathological conditions;

(b) evaluating the condition of the patient's eye to identify pathological conditions of the patient's eye;

(c) substituting in the subassembly the components exhibiting pathological conditions corresponding to the patient's eye for the corresponding healthy components.

\* \* \* \* \*